United States Patent

Suzuki et al.

[11] Patent Number: 5,812,660
[45] Date of Patent: Sep. 22, 1998

[54] PORTABLE PHONE COMPOSITE CONNECTOR

[75] Inventors: Akio Suzuki; Hiroyuki Kobayashi, both of Tokyo, Japan; Matti Hellgren, Salo, Finland

[73] Assignees: Hirose Electric Co., Ltd., Tokyo, Japan; Nokia Mobile Phones Ltd., Salo, Finland

[21] Appl. No.: 933,015

[22] Filed: Sep. 18, 1997

Related U.S. Application Data

[63] Continuation of Ser. No. 621,962, Mar. 26, 1996, abandoned.

[30] Foreign Application Priority Data

Aug. 25, 1995 [JP] Japan .................................. 7-239052

[51] Int. Cl.⁶ ........................... H04M 1/00; H04R 13/648
[52] U.S. Cl. ............................................ 379/438; 439/607
[58] Field of Search ...................................... 379/438, 437, 379/433, 428; 439/607, 609, 610, 946

[56] References Cited

U.S. PATENT DOCUMENTS 5,207,597  5/1993  Kline et al. .............................. 439/607
5,407,366  4/1995  Briones et al. ......................... 439/607

Primary Examiner—Jack Chiang
Attorney, Agent, or Firm—Kanesaka & Takeuchi

[57] ABSTRACT

A portable phone composite connector includes a housing (2) with a connection recess (3) having a rectangular opening on a front surface (2A) thereof which is substantially flush with a surface (B1) of a portable phone; a flat connector (4) provided within the connection recess and consisting mainly of an insulation plate and signal terminals (4A) arranged on the insulation plate; an RF terminal (5) provided within the connection recess adjacent to the flat connector; and a reinforcing member (6) for reinforcing a major wall (3A) of the connection recess.

5 Claims, 4 Drawing Sheets

PORTABLE PHONE COMPOSITE CONNECTOR

This application is a continuation of application No. 08/621,962, filed Mar. 26, 1996, now abandoned.

BACKGROUND OF THE INVENTION

1. Field of the Invention

The invention relates to portable phone composite connectors.

2. Description of the Prior Art

Japanese patent application Kokai No. 5-21112 discloses a composite connector such as shown in FIG. 4. The composite connector 51 is provided within a body B of a compact and thin portable phone such that the front surface 51A of the composite connector 51 is flush with a front surface B1 of the body B to receive a mating plug P.

A connection recess 52 extends rearwardly from the front surface 51A. A flat connector 53 having signal terminals and an RF terminal 54 are disposed within the connection recess 52. Battery terminals 55 are provided on the top of the composite connector 51. A turnover switch 56 is provided on the rear face of the composite connector 51.

When the portable phone is used by itself, power is supplied from a battery (not shown) through the battery terminals. When used in a car, the plug P is connected to the composite connector 51 while the turnover switch 56 is used so that power is supplied from the car battery through the plug P to the flat connector 53 while the car antenna is connected to the RF terminal 54.

The portable phone is made thin for easy handling so that the composite connector must be thin. Because of the presence of the flat connector 53 and the RF terminal 54, the upper and lower walls of the connection recess are very thin and fragile.

In order to provide the portable phone with rechargeable battery, it is necessary to provide power terminals 57 as shown by phantom line for contact with a changer, increasing the size of the portable phone.

SUMMARY OF THE INVENTION

Accordingly, it is an object of the invention to provide a portable phone composite connector which is thin but strong and has power terminals for charging without increasing the connector size.

The portable phone composite connector according to the invention is provided on a surface of the portable phone. A connection recess is provided in a housing of the composite connector for connection with a mating plug. The front surface of the composite connector is substantially flush with the surface of the portable phone. A flat connector having signal terminals arranged on an insulation plate and an RF terminal are disposed side by side within the connection recess. Battery terminals are provided on a surface other than the front surface of the composite connector.

The connection recess has a substantially rectangular opening. A metallic reinforcing member extending along a major wall of the connection recess is fitted in the connection recess to reinforce the major wall of the connection recess. It is preferred that the reinforcing section is made by bending a metallic sheet in an L-shape so as to extends along the major surface of the connection recess.

In addition, the reinforcing member is provided with power terminals for charging with a stand type charger. The power terminals are made by bending the front end portions of the reinforcing member to form integrated power terminals thereby eliminating the need for providing separate power terminals. A DC jack to be connected to household receptacle through an adaptor is provided in the front surface of the housing so as to provide a compact composite connector adapted to work with a variety of power sources.

The above and other objects, features, and advantages of the invention will be more apparent from the following description when taken in conjunction with the accompanying drawings.

DESCRIPTION OF THE PREFERRED EMBODIMENT

Figure 1:
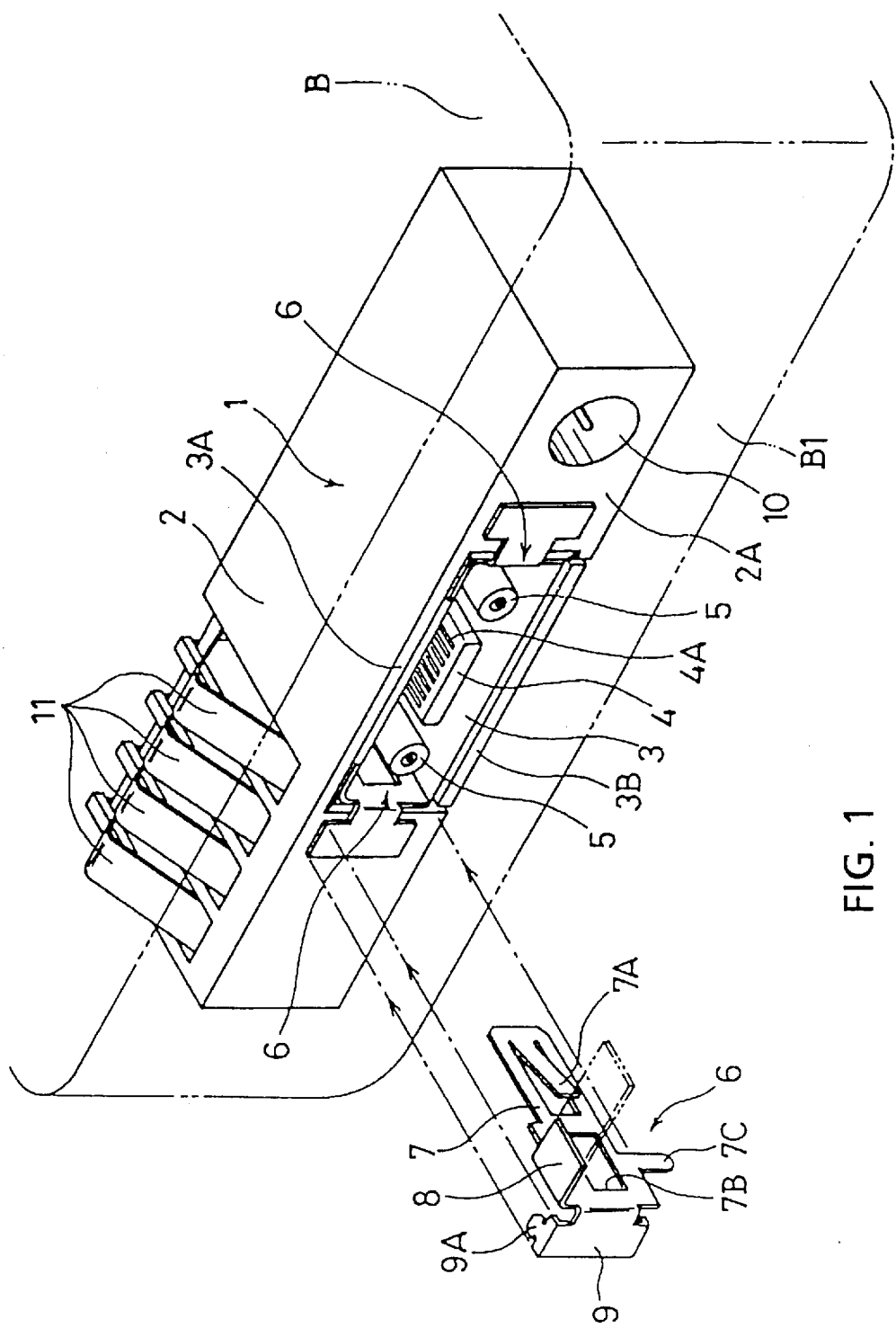
FIG. 1 is a perspective view of a portable phone composite connector according to an embodiment of the invention.

In FIG. 1, a composite connector 1 is provided within a body B of a portable phone. A housing 2 of the composite connector 1 has a connection recess 3 extending rearwardly from a front surface 2A. The front surface 2A is flush with a surface B1 of the body B.

Figure 4:
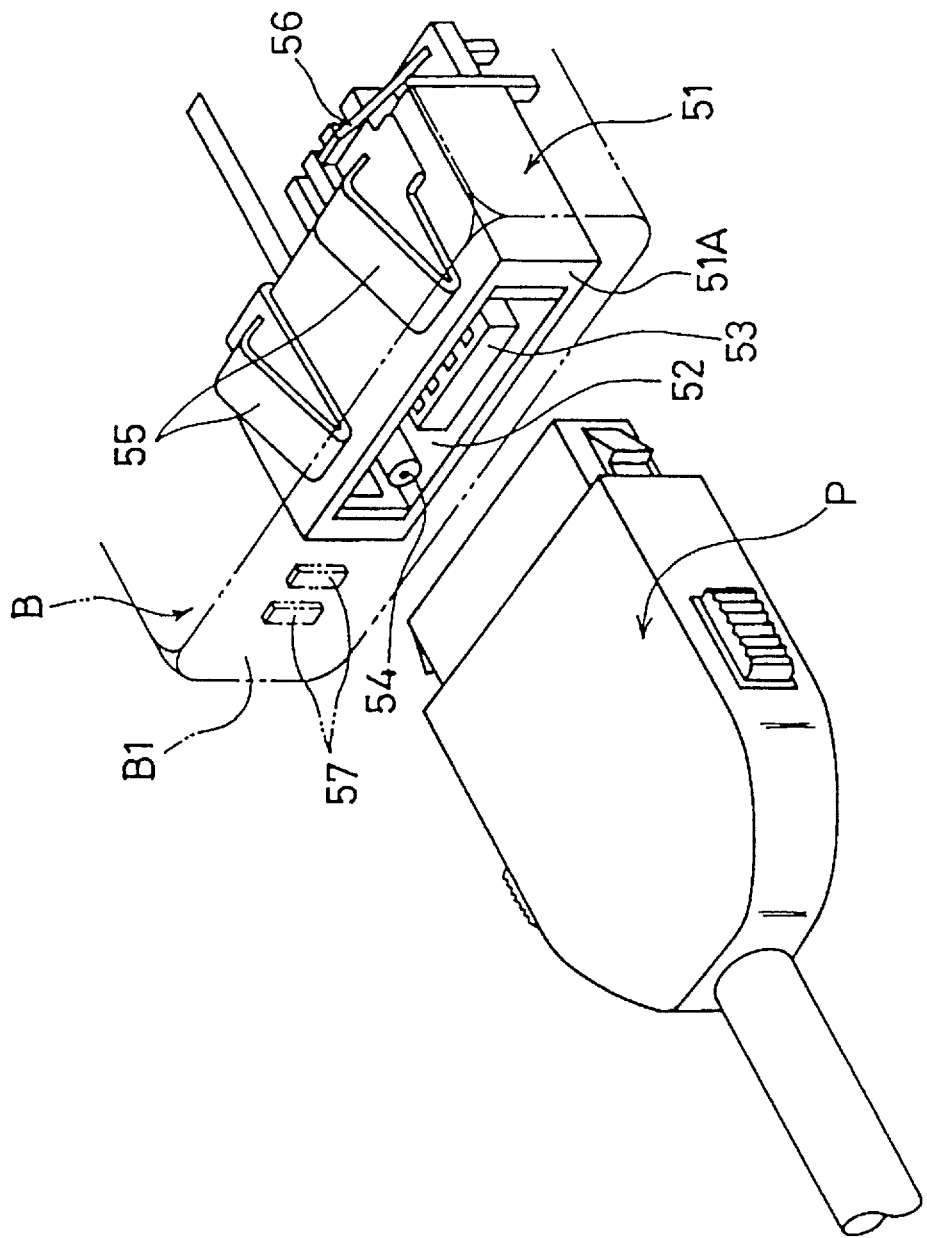
FIG. 4 is a perspective view of a conventional composite connector.

The connection recess 3 has a shape and size suitable for receiving a mating plug such as shown in FIG. 4. In this embodiment, the connection recess 3 has a rectangular front shape. A flat connector 4 and a pair of RF terminals 5 (coaxial connectors for radio frequencies) are arranged within the connection recess 3. The flat connector 4 is made up of an insulation plate and signal terminals 4A arranged on upper and lower surfaces of the insulation plate. The RF terminals 5 are disposed on opposite sides of the flat connector 4.

A pair of metallic reinforcing members 6 are provided on opposite sides of the connection recess 3 to not only reinforce the thin upper wall 3A of the connection recess 3 but also serve as power terminals for recharging by means of a stand type charger. The reinforcing member 6 is made up mainly of an insertion guide 7, a reinforcing section, and a terminal section 9. The reinforcing section 8 extends laterally from the insertion guide 7 so as to contact the upper wall 3A of the connection recess 3 while the terminal section 9 extends laterally from the insertion guide 7 so as to extend along the front surface 2A of the housing 2.

The insertion guide 7 has a latch tongue 7A for engaging an engaging section (not shown) of the housing 2 to prevent falling off, a locking aperture 7B for engaging a locking section of the mating plug, and a fixing leg 7C for mounting on a circuit board within the body B. A pair of latch tabs 9A extend rearwardly from opposite ends of the terminal section 9 to be inserted into engaging slits (not shown) of the housing 2 for securing close contact between the terminal section 9 and the front surface 2A.

A DC jack 10 is also provided in the composite connector 1 so as to open on the front surface 2A of the housing 2. The DC jack 10 is conventional and enable to supply power through an adaptor (not shown).

A battery terminals 11 project diagonally upwardly through the upper left side wall of the housing 2 for contact with a battery within the body B.

The use of the composite connection will be described below.

(1) The reinforcing members 6 are inserted into the housing 1. The reinforcing section 8 extend along the upper wall 3A of the connection recess 3 for reinforcing the thin upper wall 3A.

(2) When no external power source is used, power is supplied from the internal battery through the battery terminals 11. When household electric power is used, the DC jack 10 is used in place of the battery.

(3) In the case of mobile phones, a plug such as shown in FIG. 4 is connected to the connection recess 3.

Figure 2:
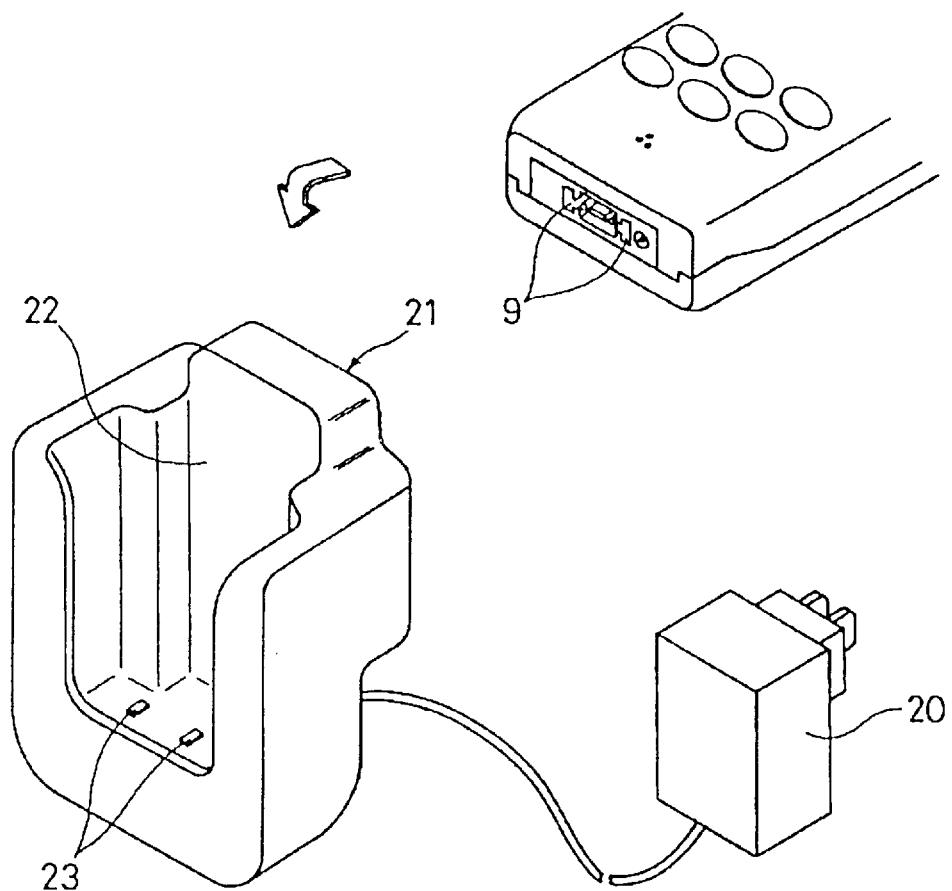
FIG. 2 is a perspective view of the portable phone employing the composite connector.

(4) In FIG. 2, when the battery is charged with a stand type charger 21, the portable phone is put in the receiving recess 22 of the charger 21 which is connected to household electric power through an adaptor 20. The terminals 9 of the reinforcing members 6 are brought into contact with contact pads 23 of the charger 21 for charging.

Alternatively, the reinforcing section 8 may be extended as shown by phantom line in FIG. 1 to enhance the reinforcing power. A lower reinforcing section may be provided to reinforce a lower wall 3B of the connection recess 3.

Figure 3:
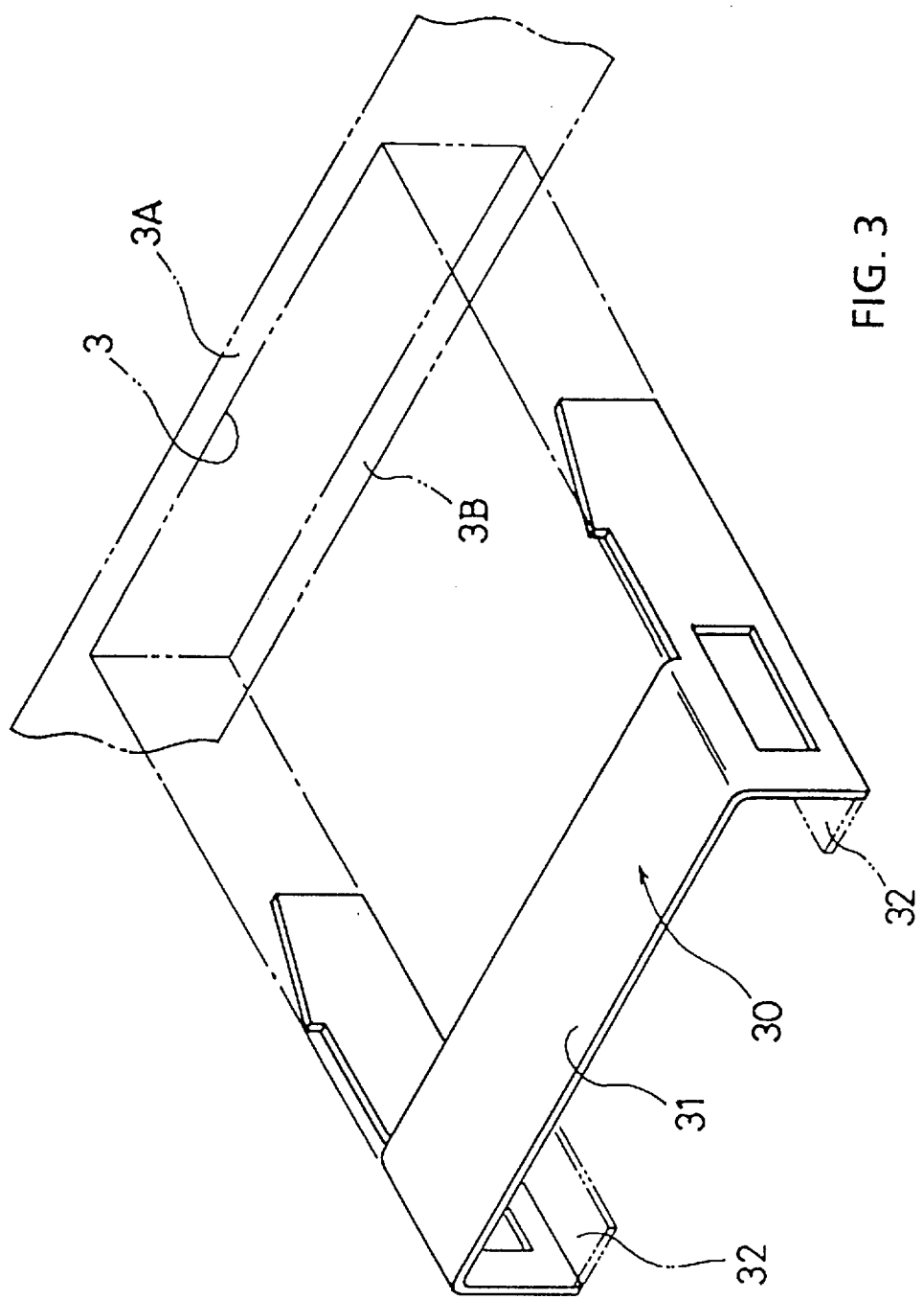
FIG. 3 is a perspective view of a reinforcing frame for the composite connector.

In FIG. 3, a single metallic reinforcing member 30 according to another embodiment of the invention is provided. A reinforcing section 31 extends in the entire width of the upper wall 3A of the connection recess 3 to increase the reinforcing power. A lower reinforcing section 32 may be provided as shown by phantom line to reinforce the lower wall 3B. For non-rechargeable models, no power terminals are provided.

Since the reinforcing members are inserted in the connection recess to reinforce the upper and/or lower wall of the connection recess, the housing can be thin and strong. The terminal sections of the reinforcing member eliminate the need for separate battery terminals thus making the portable phone compact and simple in structure. The DC jack makes the charging mechanism simple and the portable phone compact and simple in assembling work.

What is claimed is:

1. A composite connector comprising:

a housing with a connection recess having upper and lower walls and side walls defining a rectangular opening on a front surface thereof;

a flat connector provided within said connection recess and consisting mainly of an insulation plate and signal terminals arranged on said insulation plate;

an RF terminal provided within said connection recess adjacent to said flat connector;

reinforcing means extending along an inner face of said upper wall of said connection recess for reinforcing said upper wall of said connection recess from inside, a pair of insertion guides connected at right angles with said reinforcing means and inserted in said connection recess for contact with inner faces of said side walls; and terminal sections extending laterally from said insertion guides and along said front surface of said housing for contact with a power source for charging, said insertion guides having a latch tongue for engaging with said housing to prevent said reinforcing means from falling off from said housing and a locking aperture for engaging with a mating connector to prevent said mating connector from falling off from said composite connector.

2. A portable phone composite connector according to claim 1, which further comprises a DC jack extends rearwardly from said front surface of said housing.

3. A composite connector comprising:

a housing with a connector recess having upper and lower walls and side walls defining a rectangular opening on a front surface thereof;

a flat connector provided within said connection recess and consisting mainly of an insulation plate and signal terminals arranged on said insulation plate;

an RF terminal provided within said connection recess adjacent to said flat connector;

reinforcing means extending along an inner face of said upper wall of said connection recess for reinforcing said upper wall of said connection recess from inside;

a pair of insertion guides extending at right angles to said reinforcing means and inserted into said connection recess for contact with inner faces of said side walls, said insertion guides having a latch tongue for engaging said housing to prevent said reinforcing means from falling off from said housing and a locking aperture for engaging a mating connector to prevent said mating connector from falling off from said composite connector.

4. A portable phone composite connector according to 3, wherein said reinforcing means is a pair of reinforcing sections each extending from said insertion guides toward each other.

5. A portable phone composite connector according to 3, wherein said reinforcing means is a reinforcing section extending an entire width of said upper wall.

* * * * *